(12) United States Patent
Maddali et al.

(10) Patent No.: US 8,942,213 B2
(45) Date of Patent: Jan. 27, 2015

(54) METHOD AND SYSTEM FOR ACCESSING STORAGE DEVICES

(75) Inventors: Balamuralidhar Maddali, Chennai (IN); T. Sahaya George, TamilNadu (IN); Madan Kanth Lanka, Andhra Pradesh (IN); Thalha Yasir Refaye, Chennai (IN); Mahendra Nimishakavi, Hyderabad (IN); Vasanthakumar Sarpasayanam, Pondicherry (IN); Sivasankari Venkataramamoorthy, Chennai (IN); Naman Patel, Gujarat (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 598 days.

(21) Appl. No.: 13/051,635

(22) Filed: Mar. 18, 2011

(65) Prior Publication Data

US 2012/0236788 A1    Sep. 20, 2012

(51) Int. Cl.
*H04W 4/00* (2009.01)
*H04L 29/08* (2006.01)
*H04W 84/18* (2009.01)

(52) U.S. Cl.
CPC .......... *H04L 67/1097* (2013.01); *H04W 84/18* (2013.01)

USPC .......................................... 370/338; 709/227

(58) Field of Classification Search
None
See application file for complete search history.

(56) References Cited

U.S. PATENT DOCUMENTS

| | | | |
|---|---|---|---|
| 2002/0062375 A1* | 5/2002 | Teodosiu et al. | 709/226 |
| 2002/0116533 A1* | 8/2002 | Holliman et al. | 709/246 |
| 2004/0064568 A1* | 4/2004 | Arora et al. | 709/228 |
| 2006/0200570 A1* | 9/2006 | Stirbu et al. | 709/230 |
| 2010/0191785 A1* | 7/2010 | Serlet et al. | 707/827 |
| 2012/0131076 A1* | 5/2012 | Chen et al. | 707/827 |
| 2012/0185520 A1* | 7/2012 | Iarocci et al. | 707/827 |

* cited by examiner

*Primary Examiner* — Brian Roberts (57) ABSTRACT

An approach for enabling wireless communication devices to mount and/or unmount one or more storage devices to facilitate data sharing is described. A processor of a user device generates a request message according to a storage access protocol that is operating system agnostic. The processor then initiates transmission of the request message over a wireless link of an ad-hoc network to a system that includes one or more storage devices, wherein the request message requests storage device information relating to the one or more storage devices.

20 Claims, 10 Drawing Sheets

METHOD AND SYSTEM FOR ACCESSING STORAGE DEVICES

BACKGROUND INFORMATION

Service providers are continually challenged to deliver value and convenience to consumers by providing compelling network services and advancing the underlying technologies. One area of interest has been the development of services and technologies for facilitating sharing and storing of data among wireless communication devices operating in a common network environment. Typically, during the course of interaction with other devices over the network, a user of a requesting device may want to access the file system of a host device. Alternatively, the user may want to access the contents of other storage devices mounted to the host, including mass storage devices (MSDs), internal data stores and or other storage mediums. Unfortunately, there is no convenient mechanism for supporting the seamless sharing of file systems or the mounting/unmounting of storage among devices over a wireless communication network.

Based on the foregoing, there is a need for convenient, effective way to enable wireless communication devices to mount and/or unmount one or more storage devices to facilitate data sharing.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

An apparatus, method and software for process for enabling wireless communication devices to mount and/or unmount one or more storage devices to facilitate data sharing is described. In the following description, for the purpose of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Although the various exemplary embodiments are described with respect to storage devices and data exchange, it is contemplated that these embodiments have applicability to any data protocols, methodologies or systems for performing file sharing and transfer, data warehousing, data mining and the like.

Figure 1:
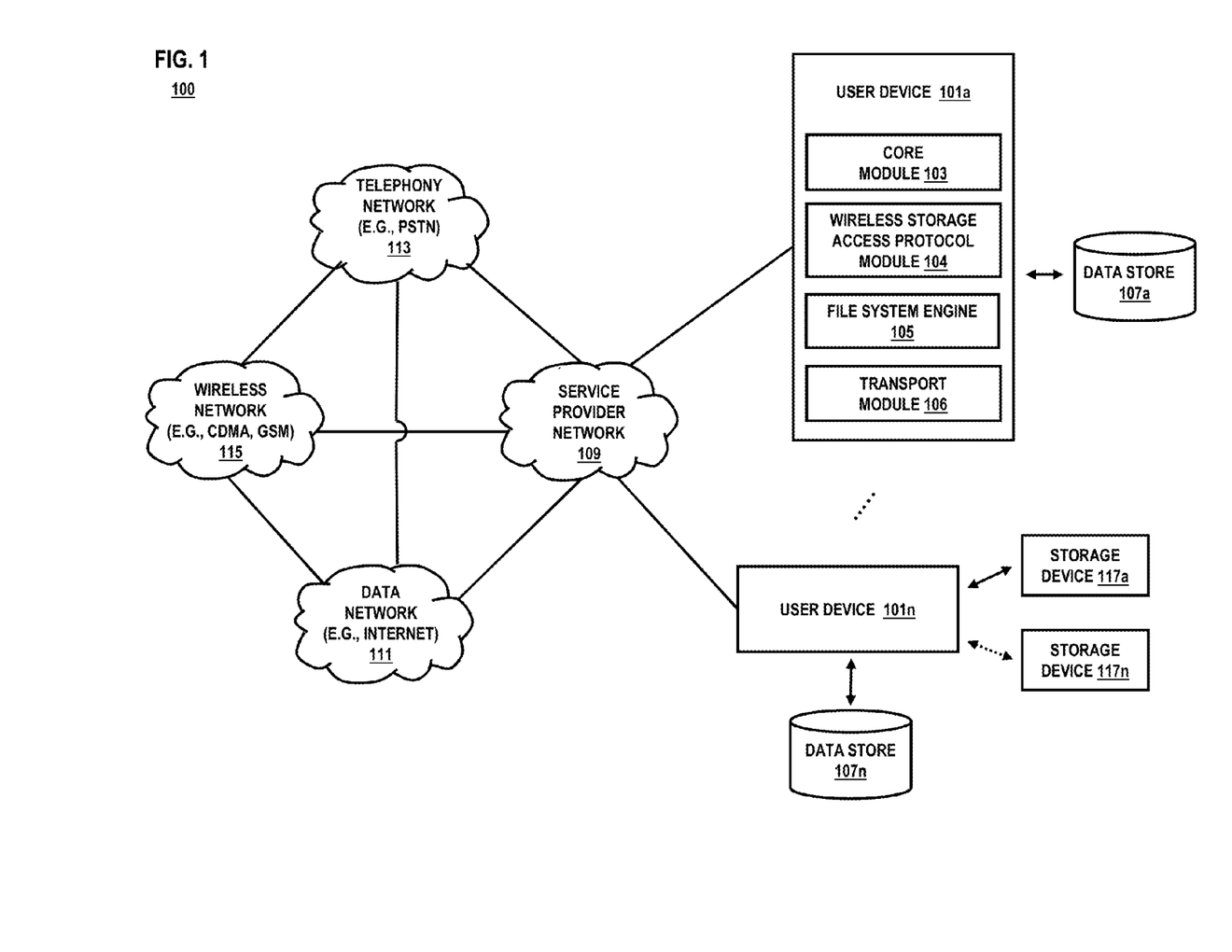
FIG. 1 is a diagram of a system for enabling wireless communication devices to mount and/or unmount one or more storage devices to facilitate data sharing, according to one embodiment.

FIG. 1 is a diagram of a system for enabling wireless communication devices to mount and/or unmount one or more storage devices to facilitate data sharing, according to one embodiment. For the purposes of illustration, system 100 is shown to include one or more user devices 101a-101n (e.g., mobile device, smart phone, netbook, laptop, set-top box (STB), or any communications enabled computing device), which are configured to communicate with each other to support data sharing. Each device 101 features one or more data storage devices, which are configured to maintain data as generated by or acquired by the user device. In certain embodiments, the data storage may be accessed by the user device as a local or internal data store 107a-107n, which may include memory such as a hard drive, random access memory (RAM) or any other storage medium directly accessible to the operating system or central processing unit (CPU) of the device 101. Also, in certain embodiments, the data store may be accessed by a device 101 as external storage devices 117a-117n, such as a mass storage device (e.g., universal serial bus (USB) connectable storage), removable media (e.g., compact disk drive, optical disk drive, flash drive, memory card drive) or remote data sources (e.g., virtual memory device, online storage). By way of example, the above described data sources, mediums, storage devices and memory devices to which a computing device 101a-101n may be mounted are referred to herein as a "file system."

Also, as used herein, the term "mounting" and "unmounting" pertains to the state, status, availability or accessibility of a memory device 107a-107n or 117a-117n by a computing device. By way of example, when a storage device 107 or 117 is mounted, this means the device is available for access by the user device 101. When the storage device is unmounted, however, it is no longer accessible by the user device 101a-101n. Gaining access to a specific data source, i.e., a file system can be an important task for facilitating computing tasks. For example, a computing device may need to either store or retrieve quantities of data at a time from different file systems. In certain instances, the file system may be an internal or externally connected data source (e.g., mass storage device) of another device that is configured to a communication network. Unfortunately, there is currently no way to readily enable a requesting device to seamlessly access the file system—i.e., hard disk, mass storage, USB drive—of another computing device configured to a network on demand. Furthermore, there is no protocol or system architecture for enabling the exchange of data regarding the mounting/unmounting of file systems and other events between devices over a wireless communication network.

To address this issue, system 100 presents a wireless storage access (WSA) protocol for enabling the sharing of file systems between multiple devices configured to a communication network. In addition, the system 100 facilitates the delivery of mount/un-mount events regarding any storage device to various devices that are connected over the network (e.g., Wi-FI) by way of the WSA protocol. As will be described more fully, the wireless storage access (WSA) protocol facilitates the following: discovery, exchange of commands, and data transfer. With respect to discovery, the protocol enables discovering all the devices (endpoints) available in the current network (e.g., all devices available over a Wi-Fi Network, detectable via near field communication (NFC), or any other ad-hoc network configuration). Also, the sharing of transferring file system commands and payloads between respective devices (endpoints) is greatly facilitated. The protocol also provides for transferring binary content between endpoints by way of a data encoding algorithm.

In certain embodiments, WSA protocol based communication includes protocols for sending control commands, data and mount/unmount event information among various devices. The WSA protocol also supports the pushing or pulling of data, i.e., any device can send or get data from any other device in the network accordingly. By way of example, file system access may be performed by connected user devices 101a-101n through device input and control means including touch screen (e.g., one click) activation, keypad activation, etc. It is noted that the WSA protocol enables the formation of a connection, port, channel, stream or data interface through which file systems at respective devices 101a-101n are able to interact without reliance upon mutual operating systems, application programming interfaces or other processing means by respective devices 101a-101n.

Figure 3:
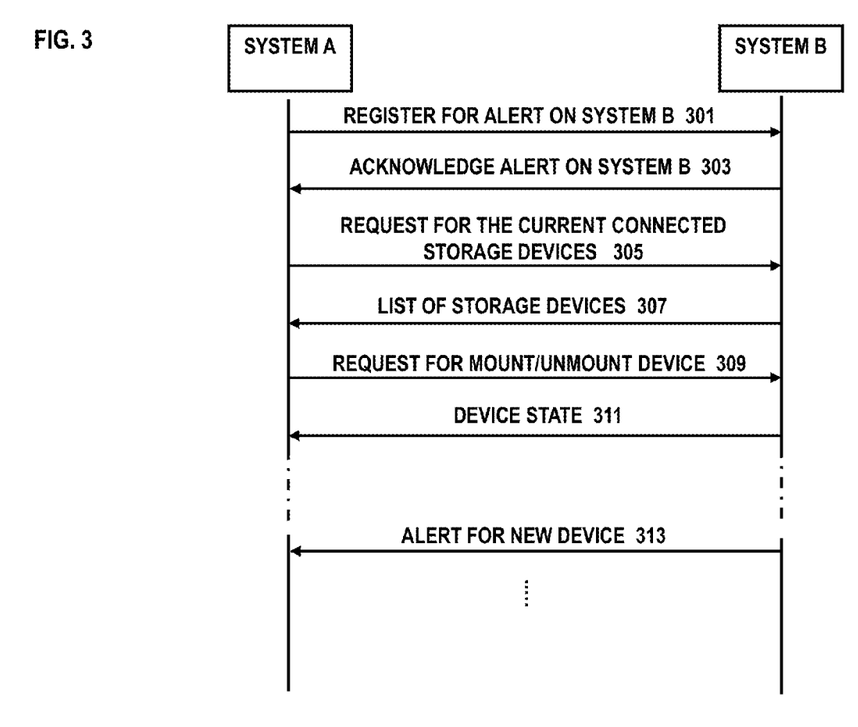
FIG. 3 is a ladder diagram showing a process for enabling wireless communication devices to mount and/or unmount one or more storage devices to facilitate data sharing, according to an exemplary embodiment.

In certain embodiments, user devices 101a-101n are configured with various executable modules for performing one or more computing, data processing and network based instructions that in combination support file system access and event data exchange. The modules can be implemented in hardware, firmware, software, or a combination thereof. According to some embodiments, the components of the user devices 101a-101n include a core module 103, a wireless service access protocol (WSAP) module 104, a file system engine 105 and a transport module 106. While shown in the figure with respect to device 101a, it is noted that modules 103-106 can also similarly configured on any other devices 101n for which a single user device 101a may interact with over a communication network. Of note, a wireless service access protocol (WSAP) and communication methodology, as illustrated with respect to FIG. 3, is supported through execution of the one or more modules across respective user devices 101a-101n.

The file system engine 105 acts as host for the file system of respective user devices 101a-101n. By way of example, the file system engine 105 captures file system mount and/or unmount event information pertaining to the user device. As used herein, "event information" or "events" refer to any data pertaining to the status, state, availability or accessibility of a file system (e.g., a storage device), including what file systems are available (e.g., by name) to a requesting device, the current state of the file system (e.g., mounted or unmounted), the type of file system available (e.g., USB, hard disk), the file system category (e.g., internal, external, virtual), etc. Events as captured by the file system engine 105 may be shared, according to a WSA protocol, with respective interacting user devices 101a-101n to enable smooth access to the file system of respective interacting endpoints/user devices independent of the underlying OS (Operating System). The file system engine 105 is configured to deliver event information regarding various file systems to the core module 103. It is noted, therefore, that the core module 103 of respective devices 101a-101n registers with the file system engine 105 of respective devices 101a-101n to enable continuous receipt of all event information.

The core module 103 is coupled to the file system engine 105 and configured to process event information captured by the engine 105. By way of example, the core module 103 handles the communication between the file system engine 105 and the WSA protocol module 104. The core module 103 is responsible for receiving and sending alerts and also sending control commands to the devices 101a-101n capable of communicating with one another over an ad-hoc, wireless communication network via WSAP. As mentioned, the module 103 registers with the file system engine 105 for all the events associated with interacting devices. Hence, it is the responsibility of the core module 103 to receive, aggregate and process all events delivered by the file system engine 105 of respective devices. As such, the core module 103 is configured to encode/decode WSAP data packets delivered to and received from the endpoints 101a-101n respectively. Also, the core module 103 handles all intra-device communication required for facilitating data exchange, including discovering endpoints over the network.

Operating in connection with the file system engine 105 and core module 103 is the WSAP module 104. The WSAP module 104 is configured to execute an operating system agnostic (e.g., neutral/independent) communication procedure. By way of example, the WSAP protocol enables the exchange of one or more text based commands between the endpoints 101a-101n, including commands for generating a response message for transmission over a wireless link of an ad-hoc, WSA based network to a device 101 having one or more storage devices 107a-107n and 117a-117n. The WSA protocol also enables formation of a response message acknowledges for acknowledging a request made by any of the interacting user devices 101a-101n for event information and/or storage device information relating to a particular storage device.

In certain embodiments, WSAP uses Base64 encoding or any other encoding technique for transferring binary content between WSA enabled endpoints 101a-101n. As such, event information and other data pertaining to respective file systems 107a-107n and 117a-117n remains intact without requiring data or packet modification during transport over the network (e.g., network 109). WSAP is configured to discover any WSA enabled endpoints—i.e., those user devices 101a-101n that are capable of communicating via WSAP over a network (e.g., network 109). Also, WSAP enables transfer of commands and the payloads between endpoints 101a-101n as well as the transfer of binary content between endpoints 101a-101n using a Base64 encoding algorithm or any other encoding algorithm.

In addition, the WSA protocol module 104 supports communication pairing between various user devices 101a-101n. By way of example, the WSA module 104 may be configured to enable data binding and listening on a particular communication port, i.e., port 4534 for supporting user datagram protocol (UDP) packets or port 4535 for supporting transmission control protocol (TCP)/server based packets. As such, the device 101a-101n initiating a communication request need not be detected or start a corresponding UDP server. Similarly a device that does not enable support of the detection mechanism, but only be an originator of data or file system access, need not start a corresponding TCP server.

Under this scenario, the WSA protocol module 104 ensures that each endpoint listens for data on the UDP port for all the UDP packets. By way of this approach, when an originating device (e.g., 101a) wants to detect another endpoint (e.g., 101n), the device generates UDP broadcasting packets. The UDP broadcast packets are generated to include an authentication key in a format defined by WSAP—i.e., implemented via Base64 encoding methodology. Upon receiving this packet, the receiving device (e.g., terminator device 101n)

can establish a TCP communication channel with the device, thus enabling a communication session/exchange over the network.

In the event no response is received by the originating device 101a from the receiving device 101n, the broadcast packet is sent at predetermined intervals (e.g., every 5 seconds up to a predetermined amount of retries (e.g., 3 times). When no response is rendered from any WSA endpoint, the originating device is then notified of the unavailability of any WSA endpoints. Thus, WSA enabled device discovery is supported.

The WSA protocol module 104 also generates broadcast packets to include a 4-digit identifier value (password) as the payload. These credentials are used by the receiving endpoint 101n for enabling authentication and security protocols to be performed for establishing a TCP connection, thus ensuring system security and integrity among devices 101a-101n. An alpha numeric key, for example, may be entered by both devices and sent from one to the other for enabling validation and identification.

A transport module 106 is also configured to support transport layer execution of the WSA protocol module 104, including handling the transfer of data between the devices/endpoints 101a-101n. The transport module 106 support various communication protocols and packet types including file transfer protocol (FTP), digital linear network alliance based schemes (e.g., for supporting set-top box communication) and other data transfer techniques. The core module 103 controls the transport module 106 and all transport layer calls made by the transport module 106 are initiated and terminated by the core module 103.

The above described modules 103-106 may be implemented for direct execution by user devices/endpoints 101a-101n to enable device or OS independent execution of the wireless service access protocol. In another embodiment, the modules 103-106 may be implemented for execution by respective user devices 101a-101n by way of a platform (not shown), such as maintained by a provider of a service provider network 109 of the user devices. Under this scenario, the one or more of the modules 103-106 are executed by the device, by the platform, or a combination thereof. The exemplary techniques and system 100 as presented enables any implementation.

User devices or endpoints 101a-101n may be any type of mobile terminal, fixed terminal, or portable terminal including a mobile handset, station, unit, device, multimedia computer, multimedia tablet, Internet node, communicator, desktop computer, laptop computer, Personal Digital Assistants (PDAs), Smartphone or any combination thereof. The user device may also be implemented as set-top box for supporting broadcast communication between the device and a service provider (e.g., television service provider).

It is also contemplated that the user devices 101a-101n can support any type of interface for supporting the presentment or exchange of data, i.e., WSAP. In addition, user devices 101a-101n may facilitate various input means for receiving and generating information, including touch screen capability, keyboard and keypad data entry, voice-based input mechanisms and the like. Any known and future implementations of user devices 101 are applicable.

In certain embodiments, user devices 101a-101n may be configured to generate an ad-hoc communication network for supporting WSAP, including via a service provider network 109. According to certain embodiments, one or more networks, such as data network 111, telephony network 113, and/or wireless network 115, can interact with the service provider network 109. Networks 109-115 may be any suitable wireline and/or wireless network, and be managed by one or more service providers. For example, telephony network 113 may include a circuit-switched network, such as the public switched telephone network (PSTN), an integrated services digital network (ISDN), a private branch exchange (PBX), or other like network. Wireless network 115 may employ various technologies including, for example, code division multiple access (CDMA), long term evolution (LTE), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like. Meanwhile, data network 111 may be any local area network (LAN), metropolitan area network (MAN), wide area network (WAN), the Internet, or any other suitable packet-switched network, such as a commercially owned, proprietary packet-switched network, such as a proprietary cable or fiber-optic network.

Although depicted as separate entities, networks 109-115 may be completely or partially contained within one another, or may embody one or more of the aforementioned infrastructures. For instance, service provider network 109 may embody circuit-switched and/or packet-switched networks that include facilities to provide for transport of circuit-switched and/or packet-based communications. It is further contemplated that networks 109-115 may include components and facilities to provide for signaling and/or bearer communications between the various components or facilities of system 100. In this manner, networks 109-115 may embody or include portions of a signaling system 7 (SS7) network, Internet protocol multimedia subsystem (IMS), or other suitable infrastructure to support control and signaling functions.

It is noted that in certain embodiments user devices 101a-101n may be configured to establish peer-to-peer communication sessions with each other using a variety of technologies—near field communication (NFC), Bluetooth, ZigBee, infrared, etc. Also, connectivity can be provided via a wireless local area network (LAN). By way of example, a group of user devices 101a-101n may be configured to a common LAN so that each device can be uniquely identified via any suitable network addressing scheme. For example, the LAN may utilize the dynamic host configuration protocol (DHCP) to dynamically assign "private" DHCP internet protocol (IP) addresses to each user device 101, i.e., IP addresses that are accessible to devices connected to the service provider network 109 as facilitated via a router. According to exemplary embodiments, user devices 101a-101n may include any customer premise equipment (CPE) capable of sending and/or receiving information over one or more of networks 109-115—e.g., set-top box. For instance, voice terminal may be any suitable plain old telephone service (POTS) device, facsimile machine, etc., whereas mobile device (or terminal) may be any cellular phone, radiophone, satellite phone, smart phone, wireless phone, or any other suitable mobile device, such as a personal digital assistant (PDA), pocket personal computer, tablet, customized hardware, etc. Further, computing device may be any suitable computing device, such as a VoIP phone, skinny client control protocol (SCCP) phone, session initiation protocol (SIP) phone, IP phone, personal computer, softphone, workstation, terminal, server, etc.

The mechanism for conveniently sharing data among these user devices 101a-101n is explained as follows.

Figure 2A:
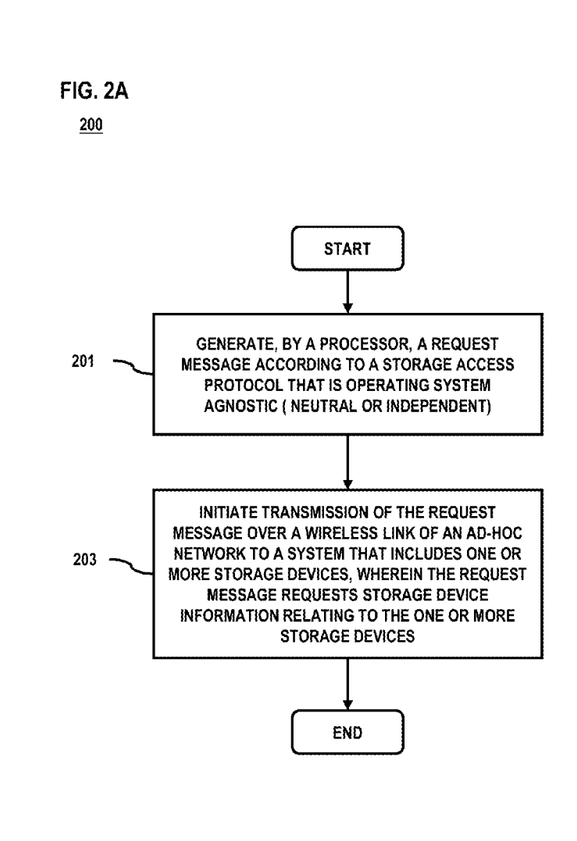
FIGS. 2A and 2B are flowcharts of a process for enabling wireless communication devices to mount and/or unmount one or more storage devices to facilitate data sharing, according to various embodiments.
Figure 2B:
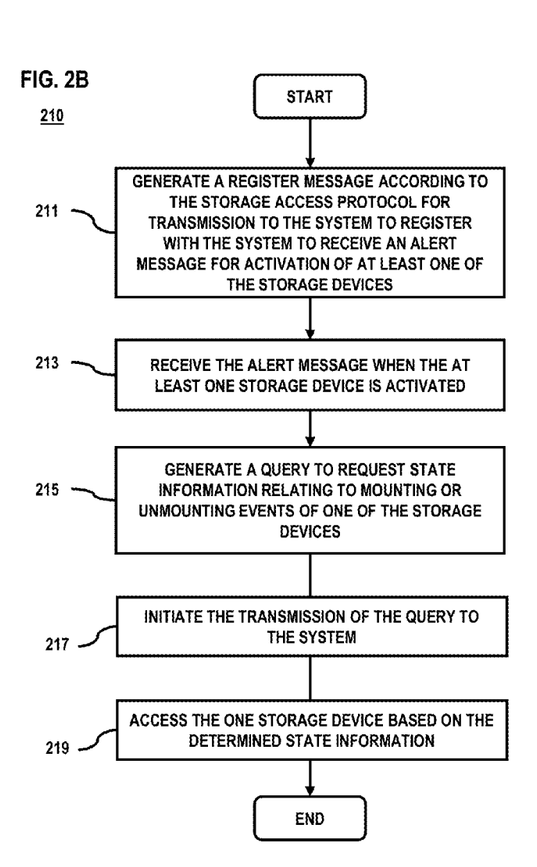

FIGS. 2A and 2B are flowcharts of a process for enabling wireless communication devices to mount and/or unmount one or more storage devices to facilitate data sharing, according to various embodiments. For the purpose of illustration, the processes are described with respect to the execution of the various modules 103-106 of FIG. 1, which are referred to individually or in combination as a "processor." It is noted that the steps of the process may be performed in any suitable order, as well as combined or separated in any suitable manner. In step 201 of process 200, a processor generates a request message according to a storage access protocol that is operating system (OS) agnostic to one or more devices having one or more storage devices 107a-107n and 117a-117n. The request message may be directed by the processor, as it operates on a device 101, to any other device 101a-101n capable of supporting the WSA protocol and hence having a similarly enabled processor. OS independence or neutrality is supported through execution of the WSA protocol.

Per step 203, the process initiates transmission of the request message over a wireless link of an ad-hoc network to a system (e.g., user device) that includes one or more storage devices. As mentioned previously, the request message may request storage device information including event data relating to the one or more storage devices 107a-107n and 117a-117n. In certain embodiments, the storage device for being accessed may include a set-top box in addition to mass storage devices, internal data stores, virtual data stores, etc.

As seen in FIG. 2B, process 210, per step 211 generates a register message according to the storage access protocol for transmission to the system to register with the system to receive an alert message for activation of at least one of the storage devices. The storage access protocol (WSAP) initiating the request is a text-based protocol, and enables initiation of a broadcast packet to an endpoint that is also configured to execute the storage access protocol. Receipt of the broadcast packet enables user device authentication and security validation, and is also used to establish a wireless link based on the protocol. In step 213, an alert message is received when at least one storage device associated with the device to which the request was sent is activated (e.g., mounted).

In step 215, the process generates a query to request state information relating to mounting or unmounting events of one of the storage devices. As mentioned previously, the state information is event information for indicating the state, status, availability, accessibility and details regarding respective file systems of a user device 101a-101n. Per steps 217 and 219, transmission of the query is initiated and one or more storage devices are made available for access based on the determined state information.

In certain embodiments, the process (e.g., modules 103-106 of FIG. 1) facilitates the various requests, queries, data exchange processes and other communication actions presented with respect to processes 200 and 210 by way of the WSA protocol. WSA Protocol (WSAP) defines the commands for communication between two or more systems, and is used by the communication channel for initial pairing between the two devices (e.g., personal computer and Tablet or Smartphone. Table 1 below depicts an exemplary syntax for implementation of various requests, queries, etc. via the WSA protocol among devices in ad-hoc WSA network. Table 2 below describes the various commands enabled for execution per the protocol for supporting device communication.

TABLE 1

FORMAT/SYNTAX

WSA:(REQUEST/RESPONSE/EVENT);
REQUEST = (REGISTER/UNREGISTER/ JOINWSAN/
    REGISTER_FOR_MOUNT_EVENTS/
    UNREGISTER_FOR_MOUNT_EVENTS / WSADEVICES_LIST/
    REJOINWSAN /UNJOINWSAN)
RESPONSE = (REGISTER_RESPONSE/UNREGISTER_RESPONSE/
    JOINWSAN_RESPONSE/
    REGISTER_FOR_MOUNT_EVENTS_RESPONSE/
    UNREGISTER_FOR_MOUNT_EVENTS_RESPONSE/
    WSADEVICES
    _LIST_RESPONSE/ REJOINWSAN_RESPONSE/
    UNJOINWSAN_RESPONSE)
EVENT = ON_EVENT

TABLE 2

WSA_BROADCAST
    This format of the command is used for broadcasting WSA broadcast packet on UDP port
    for detecting the WSA endpoints. May include data for encoding a password, identifier
    value, etc.
JOIN_WSAN
    This format of the command is used for registering the newly entering device in the WSA
    network with the Master of the Network. Input parameters may include the pin used in
    authenticating WSA endpoints.
JOIN_WSAN_RESPONSE
    This command is used for sending the response to the command REGISTER. Contains the
    response code and the response description and returns a SUCCESS or FAIL result.
UNJOINWSAN
    This command is used by the device to unjoin the WSA network. May include data for
    encoding an application identifier used for differentiating the devices registered with the
    originating device as well as a session identifier.
UNJOINWSAN_RESPONSE
    This command is used for sending the response to the command UNJOINWSAN. Contains
    the response code and the response description and returns a SUCCESS or FAIL result.
REGISTER_FOR_MOUNT_EVENTS
    This command is used by the device to register for mount/unmount events of any mass
    storage devices on the master device.
REGISTER_FOR_MOUNT_EVENTS_RESPONSE
    This command is used for sending the response to the command; may encode
    session identifier that was generated using REGISTER command. Contains the
    response code and the response description and returns a SUCCESS or FAIL result.

TABLE 2-continued

UNREGISTER_FOR_MOUNT_EVENTS
   This command is used by the device to unregister for mount/unmount events of any mass storage devices on the originating device. May encode an application identifier used for differentiating the devices registered with the originating device and a session identifier that generated using the REGISTER command. Contains the response code and the response description and returns a SUCCESS or FAIL result.
UNREGISTER_FOR_MOUNT_EVENTS_RESPONSE
   This command is used for sending the response to the command UNREGISTER_FOR_MOUNT_EVENTS. Contains the response code and the response description and returns a SUCCESS or FAIL result.
WSADEVICES_LIST
   This command is used by the device to get the list of the WSA devices that are there in the network. May encode an application identifier used for differentiating the devices registered with the originating device and a session identifier that generated using the REGISTER command.
WSADEVICES_LIST_RESPONSE
   This command is used for sending the response to the command WSADEVICES_LIST. The master device responds with the list of available devices currently in the WSA network. The list can have USB/Local Drive/CD ROM/Memory Card/SD Card/Smart Phone etc. Contains the list of available devices in an array bounded by [ ] and colon separated.
REJOINWSAN
   This command is used by the device to rejoin the WSA network in case the device is disconnected due to any reason like network failure etc. May encode an application identifier used for differentiating the devices registered with the originating device and a session identifier that generated using the REGISTER command.
REJOINWSAN_RESPONSE
   This command is used for sending the response to the command REJOINWSAN.
GET_DEVICE_MOUNT_STATE
   This command is used for getting the Mount/Un-mount state of the device connected to a WSA endpoint. Contains the description of the device for which the state is requested.
GET_DEVICE_MOUNT_STATE_RESPONSE
   This command is used for giving the Mount/Un-mount state of the device connected to a WSA endpoint. Contains the info about the device mount/un-mount state
EVENT_MOUNT_STORAGE_DEVICE
   This command is used for sending the event of the mass storage device being mounted. May provide detail regarding the event type (MOUNT/UNMOUNT), device type (e.g., Mass Storage Device), device memory in gigabytes (float value in case megabytes or less).

FIG. 3 is a ladder diagram showing a process for enabling wireless communication devices to mount and/or unmount one or more storage devices to facilitate data sharing, according to an exemplary embodiment. This process is explained with respect to a user interface of FIGS. 4A-4C for enabling wireless communication devices to mount and/or unmount one or more storage devices to facilitate data sharing, according to various embodiments. The ladder diagram 300 A and interface diagrams are presented from the perspective of a use case where the steps are carried out by two interacting user devices labeled System A 400 and System B 430 over an ad-hoc communication network. While the exemplary use case depicts interaction based, at least in part, on user action, it is noted that the various steps of FIG. 3 may be carried out automatically based on the establishment of an ad-hoc connection between devices without requiring user interaction.

Figure 4A:
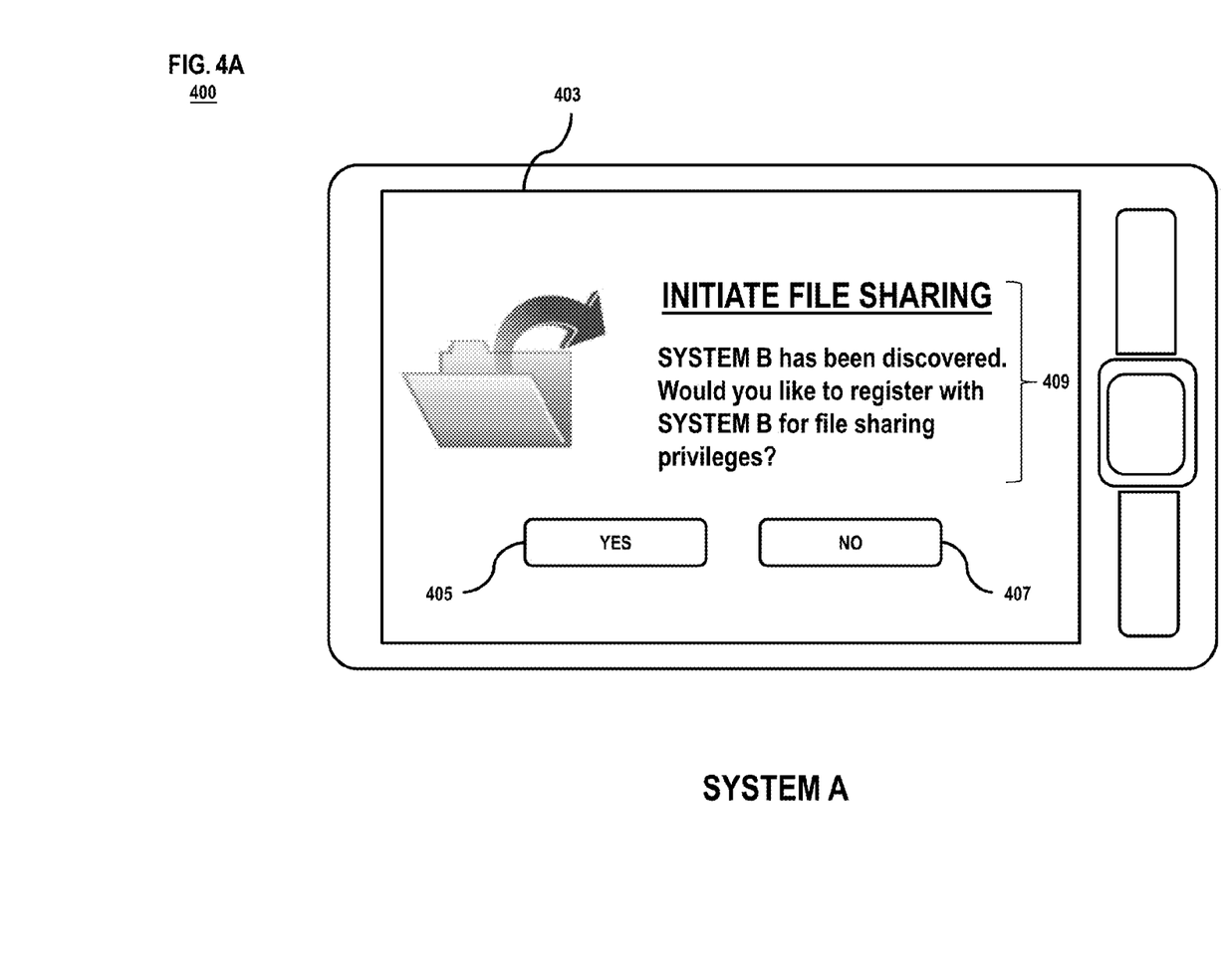
FIGS. 4A-4C are diagrams of a user interface for enabling wireless communication devices to mount and/or unmount one or more storage devices to facilitate data sharing, according to various embodiments.

In step 301, System A registers for an alert on System B, such as to detect the presence of other WSA enabled devices. In response to the alert, System B acknowledges receipt of the alert (e.g., returns SUCCESS), corresponding to step 303. Of note, the discovery process may be performed seamlessly in the manner described previously regarding device pairing. FIG. 4A shows Device 400 (System A) as presenting via its device display 403 a message 409 for indicating discovery of System B 430, and an option to access file system data (e.g., event information) regarding System B. The user can also be presented with various action buttons 405 and 407 for initiating or rejecting the request action; the actions buttons capable of execution by way of one-touch input, etc.

Figure 4B:
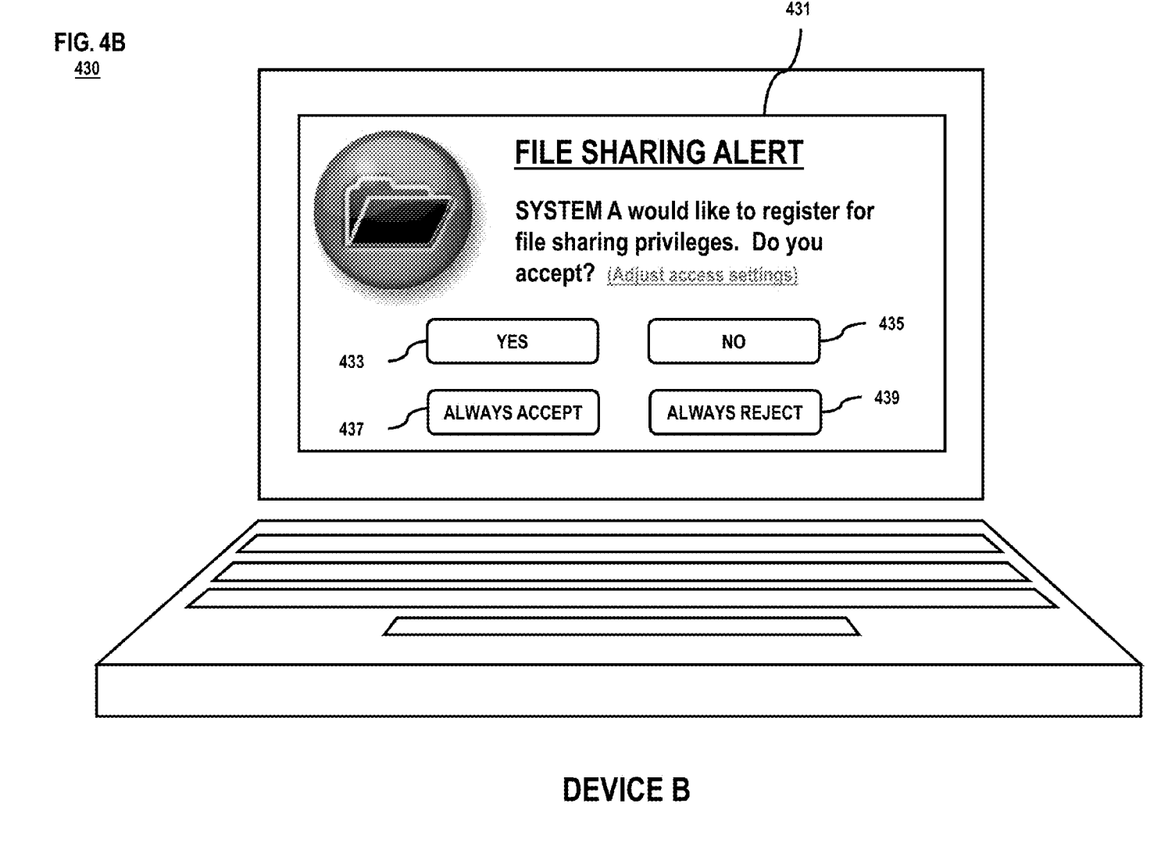

Per step 305, System A selects the "YES" action button 405 to request a list of storage devices currently connected to System B. FIG. 4B depicts the interface 431 of Device 430 (System B) in response to this step. The interface presents a message 433 indicating that System A wants to access event information regarding System B (Device 430). In addition, the interface presents various action buttons 435-441 for responding to the request accordingly, including a "YES" action button for enabling the response, a "NO" action button for disabling the response, a "ALWAYS ACCEPT" button for always accepting requests from Device 400 (System A) and a "ALWAYS REJECT" action button for always rejecting requests from DEVICE 400 (System A) respectively. Still further, the user may be presented with an "Adjust access settings" link for enabling the user to modify various device discovery, authentication or security settings (not shown) accordingly.

Figure 4C:
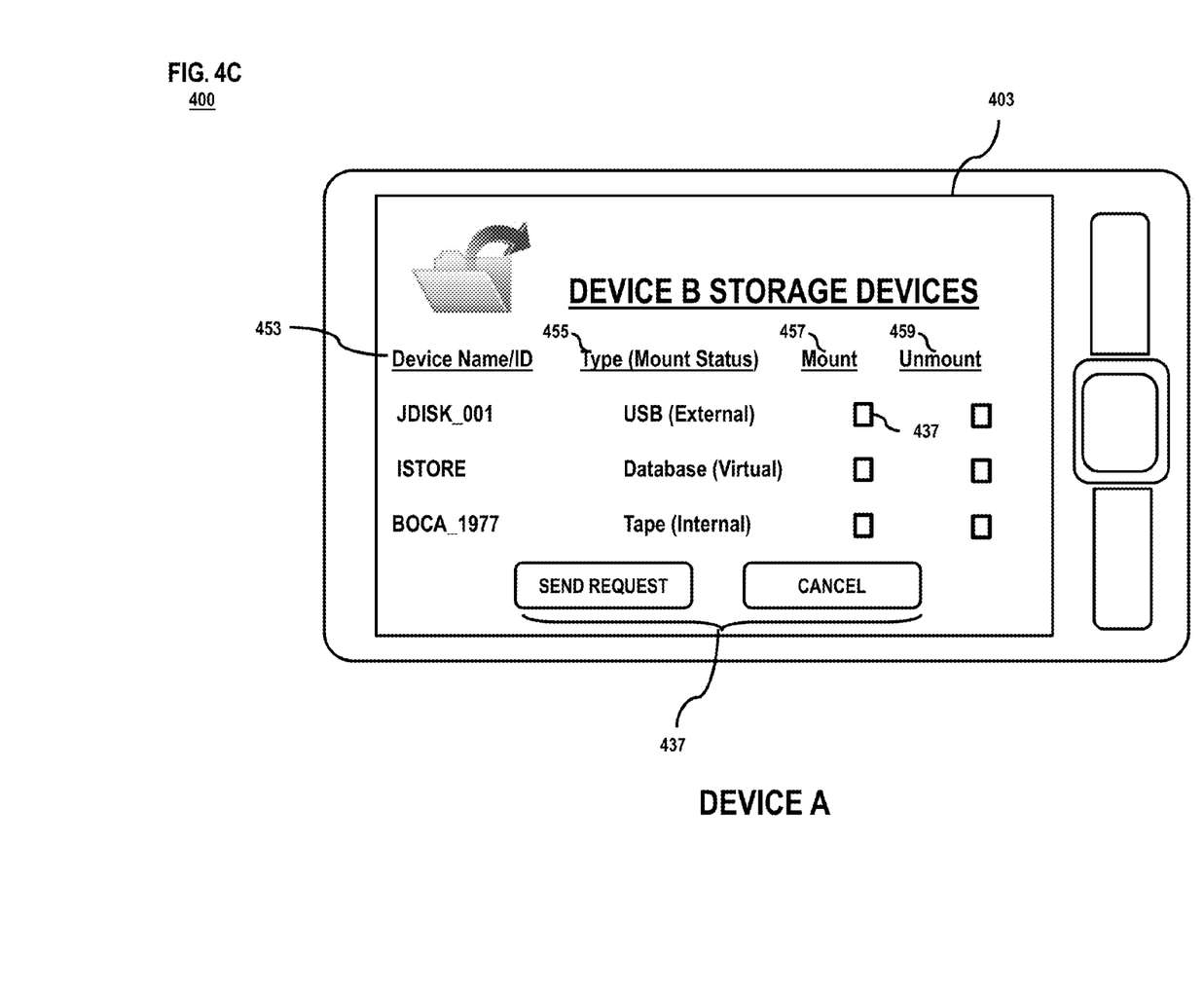

When the user selects the "YES" action button, the list of storage devices pertaining to SYSTEM B is returned (step 307) to the display 403 of Device 400, as depicted with respect to FIG. 4C. The display of System A (Device 400) presents a list comprising details regarding the various storage devices of SYSTEM B, including the Device Name and/or Identifier information 453, a storage device type and mount status 455, and various user selectable check boxes 437 for enabling a user to mount 457 or unmount 459 a listed device. When the user submits a request to mount or unmount a particular storage device presented in the list, per step 309, device state information (e.g., event information) is presented (e.g., refreshed) to the user interface 403, corresponding to step 311 of FIG. 3.

Per step 313, System A may initiate an alert for another connected device of the ad-hoc network. Once the request is honored by the additional connected device (e.g., System C), steps 303-311 for the new device can be performed.

Figure 5A:
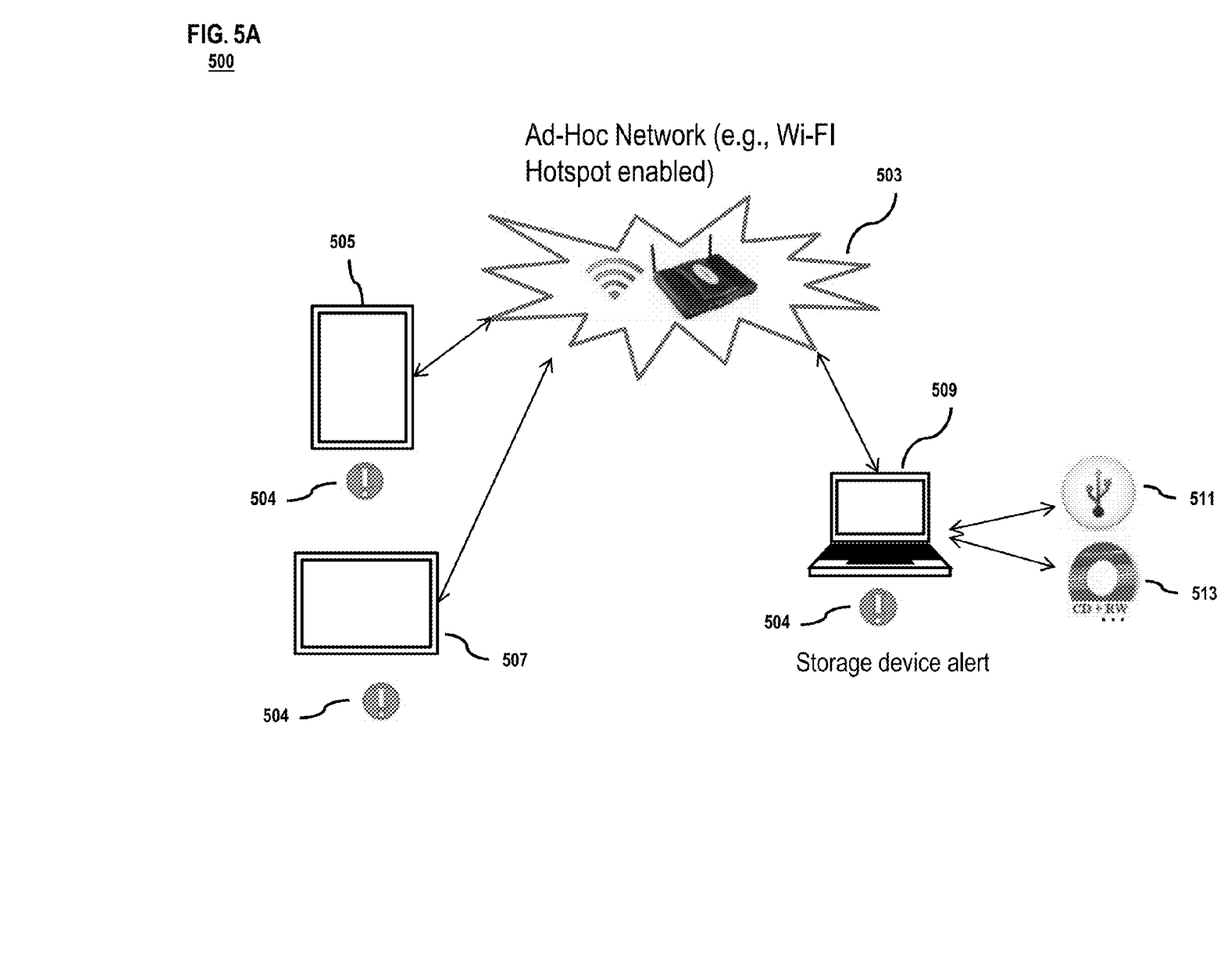
FIGS. 5A and 5B are diagrams depicting various data storage access scenarios as performed via an access storage device protocol, according to various embodiments.

FIGS. 5A and 5B are diagrams depicting data storage access scenarios as performed via an access storage device protocol, according to various embodiments. In a first scenario depicted by FIG. 5A, system 500 includes a first and second tablet device 505 and 507 respectively, which are configured to connect over an ad-hoc network 503—such as enabled through a wireless communication link provided by a Wi-Fi hotspot (e.g., router). By way of this scenario, the various tablet computers 505 and 507 receive an alert message (e.g., indicator 504) for one storage device 511 or 513 connected to a laptop computer 509 via the network 503. As described previously, each tablet can mount/unmount the storage device(s) 511 513 of the laptop 509. Under this scenario, many devices 505 and 507 access the same resources and receive alerts 504 accordingly.

Figure 5B:
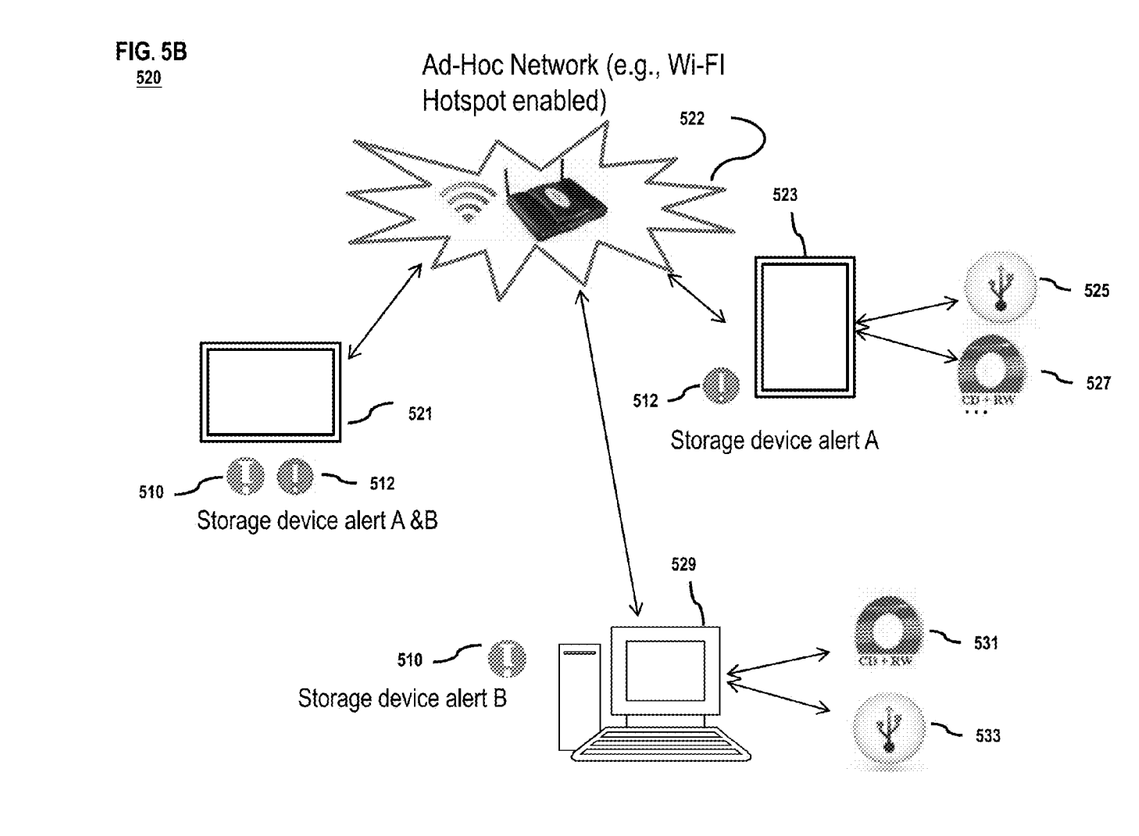

In a second scenario depicted by FIG. 5B, system 520 involves a single tablet device 521 that is configured to communicate via an ad-hoc network 522. In this example, the tablet computer 521 can receive multiple alert messages (e.g., indicators 510 and 512) for storage devices connected to another table computer 523 and desktop computer 529, which are also configured to connect to the network 522. Of note, indicator 510 corresponds to an alert for the desktop computer 529 while alert indicator 512 corresponds to an alert for the tablet computer 523. As described previously, the requesting tablet computer 521 can mount/unmount the storage device(s) 525 and 527 and 531 and 533 of receiving devices 523 and 529 respectively. Under this scenario, one device 521 access the resources of differing computers 523 and 529 and receives alerts 510 and 512 accordingly.

The exemplary techniques and systems presented herein provides users with seamless access to the file system of any device and also access to the contents of storage devices mounted on said device from any device. As discussed, the devices can be any type of personal computer or wireless communication device including a tablet computer, desktop, Smartphone, Laptop/Netbook and any other gadgets capable of processing data. By way of a wireless service access protocol, user may perform a virtual mount/unmount of the various connected storage devices as well as a physical mount/unmount of any connected mass storage devices or other physically connected storage media.

The processes described herein for enabling wireless communication devices to mount and/or unmount one or more storage devices to facilitate data sharing may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 6:
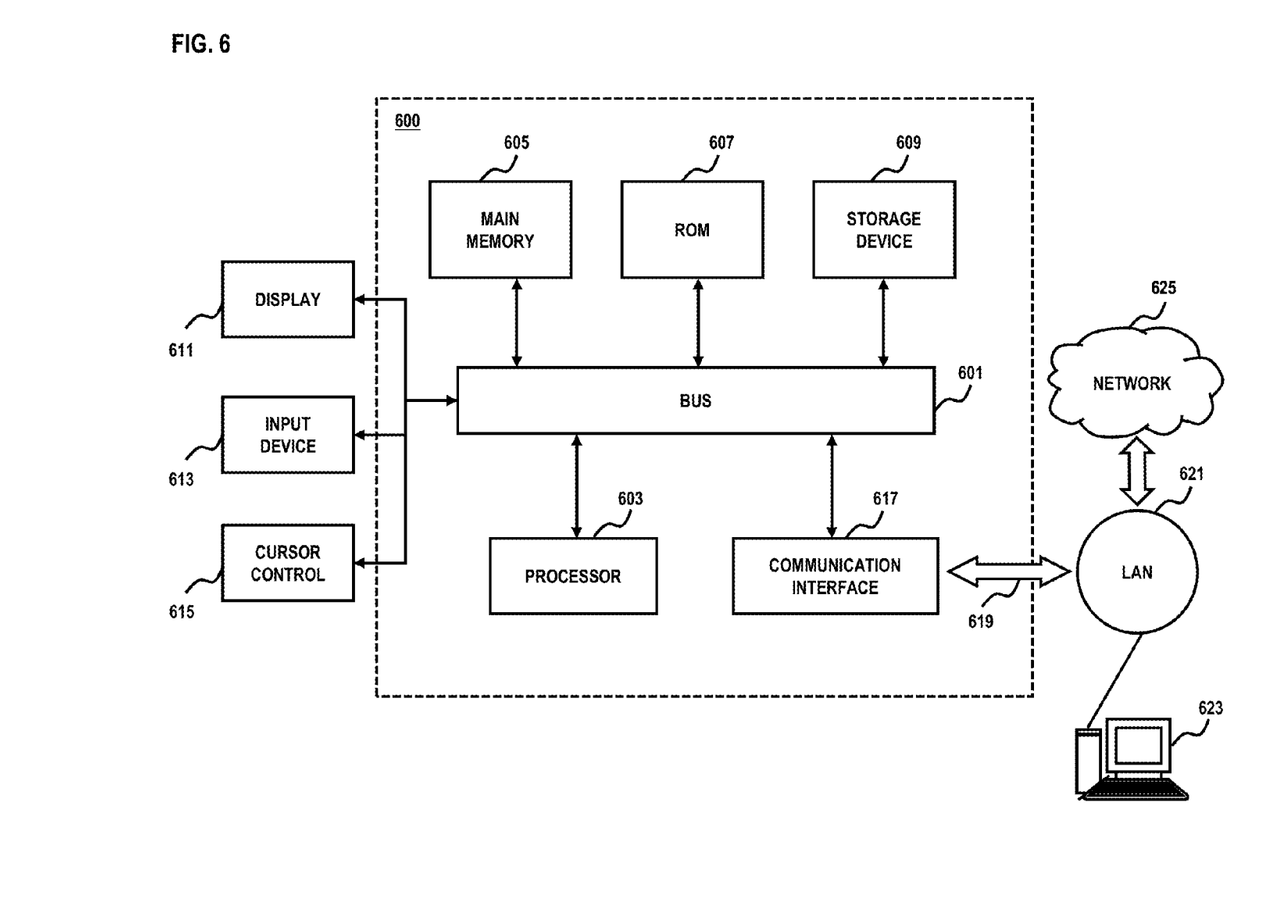
FIG. 6 is a diagram of a computer system that can be used to implement various exemplary embodiments.

FIG. 6 is a diagram of a computer system that can be used to implement various exemplary embodiments. The computer system 600 includes a bus 601 or other communication mechanism for communicating information and one or more processors (of which one is shown) 603 coupled to the bus 601 for processing information. The computer system 600 also includes main memory 605, such as a random access memory (RAM) or other dynamic storage device, coupled to the bus 601 for storing information and instructions to be executed by the processor 603. Main memory 605 can also be used for storing temporary variables or other intermediate information during execution of instructions by the processor 603. The computer system 600 may further include a read only memory (ROM) 607 or other static storage device coupled to the bus 601 for storing static information and instructions for the processor 603. A storage device 609, such as a magnetic disk or optical disk, is coupled to the bus 601 for persistently storing information and instructions.

The computer system 600 may be coupled via the bus 601 to a display 611, such as a cathode ray tube (CRT), liquid crystal display, active matrix display, or plasma display, for displaying information to a computer user. An input device 613, such as a keyboard including alphanumeric and other keys, is coupled to the bus 601 for communicating information and command selections to the processor 603. Another type of user input device is a cursor control 615, such as a mouse, a trackball, or cursor direction keys, for communicating direction information and command selections to the processor 603 and for adjusting cursor movement on the display 611.

According to an embodiment of the invention, the processes described herein are performed by the computer system 600, in response to the processor 603 executing an arrangement of instructions contained in main memory 605. Such instructions can be read into main memory 605 from another computer-readable medium, such as the storage device 609. Execution of the arrangement of instructions contained in main memory 605 causes the processor 603 to perform the process steps described herein. One or more processors in a multi-processing arrangement may also be employed to execute the instructions contained in main memory 605. In alternative embodiments, hard-wired circuitry may be used in place of or in combination with software instructions to implement the embodiment of the invention. Thus, embodiments of the invention are not limited to any specific combination of hardware circuitry and software.

The computer system 600 also includes a communication interface 617 coupled to bus 601. The communication interface 617 provides a two-way data communication coupling to a network link 619 connected to a local network 621. For example, the communication interface 617 may be a digital subscriber line (DSL) card or modem, an integrated services digital network (ISDN) card, a cable modem, a telephone modem, or any other communication interface to provide a data communication connection to a corresponding type of communication line. As another example, communication interface 617 may be a local area network (LAN) card (e.g. for Ethernet™ or an Asynchronous Transfer Model (ATM) network) to provide a data communication connection to a compatible LAN. Wireless links can also be implemented. In any such implementation, communication interface 617 sends and receives electrical, electromagnetic, or optical signals that carry digital data streams representing various types of information. Further, the communication interface 617 can include peripheral interface devices, such as a Universal Serial Bus (USB) interface, a PCMCIA (Personal Computer Memory Card International Association) interface, etc. Although a single communication interface 617 is depicted in FIGS. 4A-4C, multiple communication interfaces can also be employed.

The network link 619 typically provides data communication through one or more networks to other data devices. For example, the network link 619 may provide a connection through local network 621 to a host computer 623, which has connectivity to a network 625 (e.g. a wide area network (WAN) or the global packet data communication network now commonly referred to as the "Internet") or to data equipment operated by a service provider. The local network 621 and the network 625 both use electrical, electromagnetic, or optical signals to convey information and instructions. The signals through the various networks and the signals on the network link 619 and through the communication interface 617, which communicate digital data with the computer system 600, are exemplary forms of carrier waves bearing the information and instructions.

The computer system 600 can send messages and receive data, including program code, through the network(s), the network link 619, and the communication interface 617. In the Internet example, a server (not shown) might transmit requested code belonging to an application program for implementing an embodiment of the invention through the network 625, the local network 621 and the communication interface 617. The processor 603 may execute the transmitted code while being received and/or store the code in the storage device 609, or other non-volatile storage for later execution. In this manner, the computer system 600 may obtain application code in the form of a carrier wave.

The term "computer-readable medium" as used herein refers to any medium that participates in providing instructions to the processor 603 for execution. Such a medium may take many forms, including but not limited to computer-readable storage medium ((or non-transitory)—i.e., non-volatile media and volatile media), and transmission media. Non-volatile media include, for example, optical or magnetic disks, such as the storage device 609. Volatile media include dynamic memory, such as main memory 605. Transmission media include coaxial cables, copper wire and fiber optics, including the wires that comprise the bus 601. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 7:
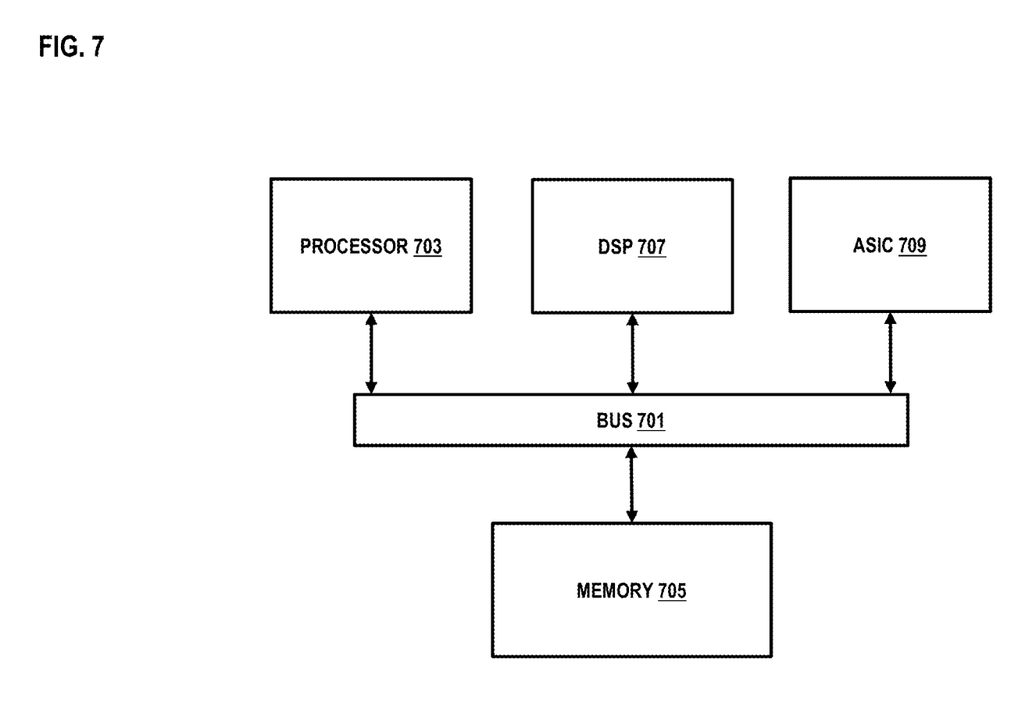
FIG. 7 is a diagram of a chip set that can be used to implement an embodiment of the invention.

FIG. 7 illustrates a chip set or chip 700 upon which an embodiment of the invention may be implemented. Chip set 700 is programmed enable wireless communication devices to mount and/or unmount one or more storage devices to facilitate data sharing as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 700 can be implemented in a single chip. It is further contemplated that in certain embodiments the chip set or chip 700 can be implemented as a single "system on a chip." It is further contemplated that in certain embodiments a separate ASIC would not be used, for example, and that all relevant functions as disclosed herein would be performed by a processor or processors. Chip set or chip 700, or a portion thereof, constitutes a means for performing one or more steps enabling wireless communication devices to mount and/or unmount one or more storage devices to facilitate data sharing.

In one embodiment, the chip set or chip 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 700 includes merely one or more processors and some software and/or firmware supporting and/or relating to and/or for the one or more processors.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein enable wireless communication devices to mount and/or unmount one or more storage devices to facilitate data sharing. The memory 705 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
   generating, by a processor, a request message according to a storage access protocol that is operating system agnostic;
   transmitting the request message over a wireless link of an ad-hoc network to a computing device that includes one or more storage devices, wherein the request message requests storage device information relating to the one or more storage devices;

generating a register message according to the storage access protocol for transmission to the computing device to register with the computing device to receive an alert message for activation of at least one storage device of the one or more storage devices; and receiving the alert message when the at least one storage device is activated.

2. A method according to claim 1, further comprising:
generating a query to request state information relating to mounting or unmounting events of one of the one or more storage devices;
transmitting the query to the computing device; and
accessing the one storage device based on the state information.

3. A method according to claim 1, wherein the processor resides in a mobile device, and the one or more storage devices include a set-top box.

4. A method according to claim 1, wherein the storage access protocol is a text-based protocol.

5. A method according to claim 4, further comprising:
broadcasting a packet to the computing device, wherein the computing device is configured to execute the storage access protocol and the broadcast packet is used to establish the wireless link.

6. An apparatus comprising:
at least one processor; and
at least one memory including computer program code for one or more programs,
the at least one memory and the computer program code configured to, with the at least one processor, cause the apparatus to perform at least the following,
generate a request message according to a storage access protocol that is operating system agnostic,
transmit the request message over a wireless link of an ad-hoc network to a computing device that includes one or more storage devices, wherein the request message requests storage device information relating to the one or more storage devices,
generate a register message according to the storage access protocol for transmission to the computing device to register with the computing device to receive an alert message for activation of at least one storage device of the one or more storage devices, and
receive the alert message when the at least one storage device is activated.

7. An apparatus according to claim 6, wherein the apparatus is further caused to:
generate a query to request state information relating to mounting or unmounting events of one of the one or more storage devices;
transmit the query to the computing device; and
access the one storage device based on the state information.

8. An apparatus according to claim 6, wherein the apparatus resides in a mobile device, and the one or more storage devices include a set-top box.

9. An apparatus according to claim 6, wherein the storage access protocol is a text-based protocol.

10. An apparatus according to claim 9, wherein the apparatus is further caused to:
broadcast a packet to the computing device, wherein the computing device is configured to execute the storage access protocol and the broadcast packet is used to establish the wireless link.

11. A system comprising:
a file system engine, implemented by a processor and/or a circuit, configured to capture a mounting event associated with a storage device;
a core module, implemented by a processor and/or a circuit, coupled to the file system engine and configured to process the mounting event; and
an access storage device protocol module, implemented by a processor and/or a circuit, configured to provide an operating system agnostic protocol to generate a response message for transmission over a wireless link of an ad-hoc network to a system that includes one or more storage devices, wherein the response message acknowledges a request for storage device information relating to a storage device of the one or more storage devices.

12. A system according to claim 11, wherein the core module is further configured to generate an alert message, when the storage device is activated, in response to a received register message according to the protocol, the register message requesting receipt of the alert message.

13. A system according to claim 11, wherein the file system engine is configured to detect a mounting event of the storage device.

14. A system according to claim 11, wherein the system is a set-top box.

15. A system according to claim 11, wherein the protocol is text-based.

16. A system according to claim 15, further comprising:
a transport layer configured to receive a broadcast packet to establish the wireless link.

17. A system according to claim 16, wherein the broadcast packet includes a code for authentication.

18. A system according to claim 11, wherein the transport layer is configured to utilize a user datagram protocol (UDP) port.

19. A method comprising:
generating, by a processor, a request message according to a storage access protocol that is operating system agnostic;
transmitting the request message over a wireless link of an ad-hoc network to a computing device that includes one or more storage devices, wherein the request message requests storage device information relating to the one or more storage devices;
generating a query to request state information relating to mounting or unmounting events of one of the one or more storage devices;
transmitting the query to the computing device; and
accessing the one storage device based on the state information.

20. An apparatus comprising:
at least one processor; and
at least one memory including computer program code for one or more programs,
the at least one memory and the computer program code configured to, with the at least one processor, cause the apparatus to perform at least the following,
generate a request message according to a storage access protocol that is operating system agnostic,
transmit the request message over a wireless link of an ad-hoc network to a computing device that includes one or more storage devices, wherein the request message requests storage device information relating to the one or more storage devices, generate a query to request state information relating to mounting or unmounting events of one of the one or more storage devices,
transmit the query to the computing device, and
access the one storage device based on the state information.

* * * * *